US006876958B1

(12) United States Patent
Chowdhury et al.

(10) Patent No.: US 6,876,958 B1
(45) Date of Patent: Apr. 5, 2005

(54) METHOD AND SYSTEM OF OPTIMIZED SEQUENCING AND CONFIGURING OF ITEMS FOR PACKING IN A BOUNDED REGION

(75) Inventors: Ashfaque Chowdhury, Greensboro, NC (US); Richard F. Lane, Greensboro, NC (US); Jennifer Janke, Kernersville, NC (US)

(73) Assignee: New Breed Corporations, Greensboro, NC (US)

( * ) Notice: Subject to any disclaimer, the term of this patent is extended or adjusted under 35 U.S.C. 154(b) by 741 days.

(21) Appl. No.: 09/607,403

(22) Filed: Jun. 30, 2000

Related U.S. Application Data

(60) Provisional application No. 60/141,962, filed on Jul. 1, 1999.

(51) Int. Cl.[7] .................................................. G06G 7/48
(52) U.S. Cl. ................... 703/7; 703/1; 703/2; 700/217; 414/801; 414/802
(58) Field of Search ............. 703/1, 2, 7; 700/213–244; 414/881–802, 787

(56) References Cited

U.S. PATENT DOCUMENTS

| 3,705,410 | A | 12/1972 | Kooy et al. ..................... 444/1 |
| 4,554,625 | A | 11/1985 | Otten |
| 4,554,635 | A | 11/1985 | Levine |
| 4,630,219 | A | 12/1986 | DiGiacomo et al. |
| 4,758,960 | A | 7/1988 | Jung |
| 4,941,183 | A | 7/1990 | Bruder et al. |
| RE33,416 | E | 10/1990 | Konishi et al. ............. 364/478 |
| 5,175,692 | A | 12/1992 | Mazouz et al. ............. 364/478 |
| 5,258,917 | A | 11/1993 | Bruder et al. |
| 5,262,956 | A | 11/1993 | DeLeeuw |
| 5,291,396 | A | 3/1994 | Calcerano et al. .......... 364/401 |
| 5,363,313 | A | 11/1994 | Lee |
| 5,379,229 | A | 1/1995 | Parsons et al. ............. 364/478 |
| 5,430,831 | A | 7/1995 | Snellen ....................... 395/133 |
| 5,493,491 | A | 2/1996 | Calcerano et al. .......... 364/403 |
| 5,501,571 | A | 3/1996 | Van Durrett et al. ....... 414/786 |
| 5,703,781 | A | 12/1997 | Martell et al. ......... 364/470.06 |
| 5,720,157 | A | 2/1998 | Ross ........................... 53/445 |
| 5,748,762 | A | 5/1998 | Guez ........................ 382/111 |
| 5,815,398 | A | 9/1998 | Dighe et al. ........... 364/478.05 |
| 5,831,662 | A | 11/1998 | Payton .......................... 348/7 |
| 5,844,807 | A | 12/1998 | Anderson et al. ...... 364/478.05 |
| 5,893,076 | A | 4/1999 | Hafner et al. ................. 705/28 |

OTHER PUBLICATIONS

Raidl et al, "Genetic Algorithms for the Multiple Container Packing Problem," Lecture Notes on Computer Science, vol. 1498, pp. 875–884 (Sep. 1998).*
Chua et al, "Constraint–Based Spatial Representation Technique for the Container Packing Problem," Integrated Manufacturing Systems, vol. 9 No. 1, pp. 23–et seq (1998).*
Fekete, "A New Exact Algorithm for General Orthogonal D–Dimensional Knapsack Problems," Universität zu Köln (1997)(paper available at: http://citeseer.nj.nec.com/fekete97new.html).*
Scheithauer et al, "A Heuristic Approach for Solving the Multi–Pallet Packing Problem," Dresden University of Technology (May 1996)(paper available at: http://citeseer.nj.nec.com/scheithauer96heurisitic.html).*
Pisinger, "Algorithms for Knapsack Problems," Ph.D. Thesis, University of Copenhagen (Feb. 1995)(paper available at: http://citeseer.nj.nec.com/pisinger95algorithms.html).*
Chen et al, "An Analytical Model for the Container Loading Problem," European Journal of Operations Research, vol. 80 No. 1, pp. 68–76 (Jan. 1995).*
Simon Szykman and Jonathan Cagan; "Automated Generation of Optimally Directed Three Dimensional Component Layouts"; DE–vol. 65–1, Advances in Design Automation 1993, pp. 527–537, vol. 1; American Society of Mechanical Engineers, New York, NY, USA.
Zuo Dai and Jianzhong Cha; A Hybrid Approach of Heuristic and Neural Network for Packing Problems: DE–vol. 69–2, Advances in Design Automation—1994, pp. 117–123, vol. 2: American Society of Mechanical Engineers, New York, NY, USA.
Zuo Dai, Jainzhong Cha and Junliang Yuan; "An Octree–Based Heuristic Algorithm for 3–D Packing"; DE–vol. 69–2, Advances in Design Automation—1994, pp. 125–133, vol. 2; American Society of Mechanical Engineers, New York, NY, USA.
Rahul Dighe and Mark J. Jakiela; "Solving Pattern Nesting Problems with Genetic Algorithms Employing Task Decomposition and Contact Detection"; Journal Article; Evolutionary Computation 3(3): pp. 239–266, 1996, Massachusetts Institute of Technology.

(Continued)

*Primary Examiner*—Samuel Broda, Esq.
(74) *Attorney, Agent, or Firm*—Kilpatrick Stockton LLP

(57) ABSTRACT

The present invention includes methods of selecting cases in which to pack items in an item order and selecting the sequence and configuration of placement of items into the selected cases. One such method includes examining an order comprising a list of items to be packed, determining the cases available for packing, determining the minimum number of cases required for packing the items in the list of items to be packed, selecting a case to be packed with one or more of the items in the list of items to be packed, wherein said selecting a case comprises determining a desired average volume per case and selecting the smallest of the cases available to be packed that comprises a volume in excess of the average volume per case, and determining the configuration of placement in the case to be packed of items in the list of items to be packed. Such steps may be repeated until all items in the item list are selected and configured for packing.

34 Claims, 7 Drawing Sheets

OTHER PUBLICATIONS

Manuel E. Sosa: "Optimal Packing of Three Dimensional Shapes Using Genetic Algorithms"; Masters Thesis: Department of Mechanical Engineering, Massachusetts Institute of Technology, Jun. 1996.

"Ryder paves the way for Delfour in the UK"; Magazine Article; European Supply Chain Decision; http://www.delfour.com/Public/Del4RyderArt/Del4RyderLarge1.htm, Jun. 7, 1999.

John A. George et al; "Packing Different–Sized Circles Into a Rectangular Container"; European Journal of Operational Research 84 (1995); pp. 693–712.

Berthold Korger; "Guillotineable Bin Packing: A Genetic Approach"; European Journal of Operational Research 84 (1995); pp. 645–661.

Khushro Shahookar and Pinaki Mazumder; "A Genetic Approach to Standard Cell Placement Using Meta–Genetic Parameter Optimization"; IEEE Transactions on Computer–Aided Design, vol. 9 (1990): pp. 500–511.

Weishuang Qu and Jerry L. Sanders; "Sequence Selection of Stock Sheets in Two–Dimensional Layout Problems"; International of Production Research, vol. 27 (1989); pp. 1553–1571.

Weishuang Qu and Jerry L. Sanders; "A Nesting Algorithm For Irregular Parts and Factors Affecting Trim Losses"; International Journal of Production Research, vol. 25 (1987); pp. 381–397.

Y.K.D.V. Prasad and Professor S. Somasundaram; "CASNS—A Heuristic Algorithm for the Nesting of Irregular–Shaped Sheet–Metal Blanks"; Computer–Aided Engineering Journal, vol. 8 (1991); pp. 69–73.

Antonio Albano and Guiseppe Sapuppo; "Optimal Allocation of TWo–Dimensional Irregular Shapes Using Heuristic Search Methods"; IEEE Transactions on Systems, Man, and Cybernetics, vol. SMC–10 (1980); pp. 242–248.

B.T. Cheok and A.Y.C. Nee; "Algorithms for Nesting of Ship/Offshore Structural Plates"; Advances in Design Automation vol. 2 (1991); pp. 221–226.

Iikka Tapio Ikonen, "A Genetic Algorithm For A Three–Dimensional Non–Convex Bin Packing" (Abstract), *Dissertation Abstracts*, vol. 59–07B, 1998, pp. 3634, dissertation 11/98.

Randy L. House & Cihan H. Daghli, "Approach to Three Dimensional Packing Using Genetic Algorithms" (Abstract), *Intelligent Engineering Systems Through Artificial Neural Networks*, vol. 2, 1992, pp. 937–942.

Takashi Kawakami & Yukinori Kakazu, "Strategy Acquisition of the 3–D Packing Problem in Multiagent Environment (GA–based Hierarchical Tuning)" (Abstract), *Nippon Kikai Gakkai Ronbunshu, C Hen/Transactions of the Japan Society of Mechanical Engineers, Part C*, vol. 60, No. 577, Sep. 1994, pp. 3219–3225.

I.T. Ikonen, W.E. Biles, J.E. Lewis, A. Kumar, & R.K. Ragade, "GARP: Genetic Algorithm for Part Packing in a Rapid Prototyping Machine" (Abstract), *Proceedings of the SPIE—The International Society for Optical Engineering*, vol. 3517, 1998, pp. 54–62.

J.E. Lewis, R.K. Ragade, A. Kumar, W.E. Biles, & I.T. Ikonen, "Using Distributed Genetic Algorithms in Three–Dimensional Bin Packing for Rapid Prototyping Machines" (Abstract), *Proceedings of the SPIE—The International Society for Optical Engineering*, vol. 3517, 1998, pp. 45–53.

S.P. Larcombe, D.J. Pendergast, N.A. Thacker, & P.A. Ivey, "Initial Development of a Genetic Algorithm to Automate System Implementation in a Novel Electronic Packdging Technology" (Abstract), *Second International Conference on Genetic Algorithms in Engineering Systems: Innovations and Applications*, Conf. Publ. No. 446, 1997, pp. 486–491.

S.P. Larcombe, D.J. Pendergast, N.A. Thacker, & P.A. Ivey, "Using Genetic Algorithms to Automate System Implementation in a Novel Three–Dimensional Packaging Technology" (Abstract), *Proceedings International Conference on Computer Design, VLSI in Computers and Processors*, 1996, pp. 274–279.

T.Kawakami & Y. Kakazu, "A GA–based Hierarchical Tuning of the 3–D Packing Strategy in a Multidgent Environment" (Abstract), *Proceedings 1994 Japan–U.S.A. Symposium on Flexible Automation—A Pacific Rim Conference*, vol. 3, 1994, pp. 1319–1326.

J.–L. Lin, B. Foote, S. Pulat, C.–H. Chang, & J.Y. Cheung, "Hybrid Genetic Algorithm for Container Packing in Three Dimensions" (Abstract), *Proceedings. The Ninth Conference on Artificial Intelligence for Applications*, 1993, pp. 353–359.

A.L. Corcoran & R.L. Wainwright, "A Genetic Algorithm for Packing in Three Dimensions" (Abstract), *Applied Computing: Technological Challenges of the 1990's. Proceedings of the 1992 ACM/SIGAPP Symposium on Applied Computing*, 1992, pp. 1021–1030.

T. Kawakami, M. Minagawa, & Y. Kakazu, "Auto Tuning of 3–D Packing Rules Using Genetic Algorithms" (Abstract), *Proceedings IROS '91. IEEE/RSJ international Workshop on Intelligent Robots and Systems '91. Intelligence for Mechanical Systems*, 1991, vol. 3, pp. 1319–1324.

S.S. Tong, "Integration of Symbolic and Numerical Methods for Optimizing Complex Engineering Systems" (Abstract), *IFIP Transactions A, Computer Science and Technology*, vol. A–2, 1992, pp. 3–20.

* cited by examiner

METHOD AND SYSTEM OF OPTIMIZED SEQUENCING AND CONFIGURING OF ITEMS FOR PACKING IN A BOUNDED REGION

RELATED PATENT APPLICATION

The present patent application is related to U.S. Provisional Patent Application Ser. No. 60/141,962, entitled "Method of Optimized Sequencing and Configuring of Items to be Picked, Packed, and Shipped; and Method of Efficiently and Optimally Receiving, Processing, and Acting On Item Orders," which was filed in the United States Patent and Trademark Office on Jul. 1, 1999. The present application hereby claims priority to, and incorporates by references in full, this referenced United States Provisional Patent Application Ser. No. 60/141,962.

FIELD OF THE INVENTION

The present invention relates generally to the optimized packing of items in one or more bounded regions. In particular, embodiments of the present invention relate to the optimized packing of three-dimensional items in one or more cases (e.g., shipping boxes) for shipping.

BACKGROUND OF THE INVENTION

The term "three-dimensional pattern nesting" refers to the process of arranging multiple three-dimensional objects in an optimized or near-optimized configuration so as to occupy the least amount of total space in a bounded region and to minimize associated costs and risks. Two-dimensional pattern nesting of planar objects has been studied extensively due to the significant interest of many industries in which efficient utilization of materials from which parts are fabricated is highly desired; for instance, the garment industry, the sheet metal industry, and the auto industry. As is apparent, a single extra percent of material utilization can result in a large amount of total dollar savings where parts are to be mass produced.

Problems complicating two-dimensional pattern nesting in these industries have been considered. For instance, in the sheet metal, steel and garment industries, predetermined part shapes are typically cut from one or more layers of material (e.g. sheet metal, steel, cloth, leather, etc.) having a rectangular shape of fixed width. However, due to directional properties of the materials (for example, the warp and weave of textiles) from which the part shapes are to be cut, the part shapes can only be arranged along relatively few of a plurality of possible rotational orientations. See, for example, U.S. Pat. No. 5,815,398 (September 1998).

In the semiconductor industry, the specific problems facing the production of mask patterns for circuit integration have also been considered. Here, the problem is the dissection of rectangles into smaller rectangles where the usefulness and the quality of the dissection depend on the position of the rectangles relative to each other and to the enveloping rectangle. See, for example, U.S. Pat. No. 4,554,625 (November 1985).

Also previously considered is two-dimensional pattern nesting in the context of stock-cutting. In particular, stock-cutting in which a machine is capable of dissecting rectangular sheets up to a certain size by a cut parallel to one of the sides and all the way across the sheet has been considered. See, for example, U.S. Pat. No. 4,554,625 (November 1985).

Application of three-dimensional pattern nesting to the order fulfillment and shipping industry (affectionately called the "pick, pack and ship" or "PPS" industry) presents a unique and especially difficult problem. Unlike in the traditional industries in which two-dimensional pattern nesting algorithms have been extensively studied and applied, optimization of materials utilization has not been widely recognized as a viable goal in the PPS industry. This is due in part to the existence of various, often competing, cost-related constraints.

Existing automation packages tailored to the PPS industry, for example the Delfour Warehouse Management System™ package, provide automated warehouse administration services for areas such as inventory management, route planning, order picking and billing/invoicing, but do not provide optimization of order picking, packing and shipping. Additionally, existing systems are insufficient to accommodate the complexity of real-world needs of the PPS industry.

What is needed is an effective method and system for optimization of the costs associated with order fulfillment in the PPS industry. Specifically, a method of optimized sequencing and configuring of items to be picked, packed and shipped is needed.

SUMMARY OF THE INVENTION

The present invention provides methods and systems for picking items for packing in bounded regions, such as cases, in an optimal manner. In one embodiment, a method according to the present invention comprises examining an order comprising a list of items to be packed, determining the cases available for packing, determining the minimum number of cases required for packing the items in the list of Items to be packed, selecting a case to be packed with one or more of the items in the list of items to be packed, wherein selecting a case comprises determining a desired average volume per case and selecting the smallest of the cases available to be packed that comprises a volume in excess of the average volume per case, and determining the configuration of placement in the case to be packed of items in the list of items to be packed. Such steps are repeated until the list of items to be packed is emptied (i.e., until all items in the order are designated for placement in cases). In carrying out this method according to the present invention, determining the cases available for packing may comprise examining a list of available case types, such as a list of cases in inventory and the quantity of each type available.

In an embodiment, determining the minimum number of cases required for packing the items in the list of items to be packed comprises calculating several variables and comparing those variables. For example, in an embodiment, a weight-based minimum case variable, an item-based minimum case variable, and a fill-based minimum case variable are calculated. These variables indicate the minimum number of cases that may be used to fill the order based solely on weigh, item numbers, and fill numbers, respectively. In an embodiment, the step of determining the minimum number of cases includes adding one to the integer value of the largest of the weight-based minimum case variable, item-based minimum case variable, and fill-based minimum case variable.

Similar calculation methods may be used to calculated the desired average volume per case. For example, in an embodiment, the desired average volume per case comprises the product of the volume of all items on the list of items to be packed and one plus one minus a maximum fill constraint divided by the minimum number of cases required for packing the items in the list of items to be packed.

In an embodiment, the step of determining the configuration of placement in the case to be packed of items in the list of items to be packed comprises several steps. The unused volume in the case to be packed is first divided into one or more cubes (the entire case is used in this step when no items have been selected to be placed in the case at hand), one of the cubes (e.g., the smallest) is selected to be packed, and the largest item from the list of items to be packed is selected to be packed in the cube at hand. Once selected for placement, the item is removed from the list of items to be packed, and the volume associated with the cube selected to be packed is designated as occupied by the item for packing, and the item is designated for packing next in that cube and the associated case. Next, if volume within the case that may hold an item from the list of items to be packed has not been designated as occupied, and if the list of items to be packed is not empty, these steps are repeated. The first item selected in this way is the first item that will be packed in the case, and the second item will be the second item packed, and so on.

When selecting an item for a particular cube, various cartonization constraints are considered to be sure that none are violated. For example, if selection of an item for placement in a case would cause the case to exceed its maximum weight constraint, the item is not selected.

The order of selection of items and the appropriate case selected for placement of the item are recorded in a data file. This file is used to print a pick label, which indicates the type of case for packing and a list of items for packing in the type of case. This pick label is used by a picker (e.g., a human being or a machine) to select the indicated case from a case inventory and to select the indicated items from an item inventory in the order selected by these steps.

Embodiments of the present invention further include methods and systems of optimized sequencing and configuring of items to be picked, packed and shipped. For example, the present invention provide methods and systems for optimization of the costs associated with order fulfillment in the PPS industry. Embodiments include methods and systems that incorporates the three-dimensional pattern nesting algorithms to sequence and configure items to be picked, packed and shipped.

In accordance with the present invention, one or more orders, each containing one or more items, are received. An item list is constructed by extracting individual items from the orders and the item list is then sequenced and the items configured for picking, packing in one or more cartons and shipping taking into account one or more pre-established constraints, including the following: maximum case weight, defined as a pre-determined weight that cases cannot exceed; maximum item counts, defined as a pre-determined item count which cases cannot exceed; maximum case fill, defined as a pre-determined maximum percentage utilization of the space within the bounded region (a.k.a. the carton, case or box); maximum layers, defined as a pre-determined number of layers of items in a case that cannot be exceeded; and item specific values, such as length, width, height, weight, and pre-pack and carrier quantity; and carton specific values, such as length, width, height, and availability.

More specifically, receipt of orders and construction of the item list occurs in the following manner: An item list is built by extracting individual items from one or more orders to be fulfilled (i.e., picked, packed and shipped) and items on the item list are then evaluated to determine if one or more pre-pack cases are being ordered. Items that are determined to be pre-pack cases are subtracted from the items list. Loose pick quantities are next converted to multiple item packages if applicable; pre-pack cases are composed of carriers.)

The remaining items on the item list are then sequenced for picking, packing and shipping in the following manner: First, the minimum number of cases required to hold the items on the loose pick items list is determined by three separate calculations based on weight, item count and volume, and the greatest minimum from the three calculations is then selected. Cases that are too small are eliminated based on the height and length of the individual items on the item list (these being the "loose pick items.") From the cases remaining, the smallest case volume which will accommodate average volume per case is determined by multiplying the total cubic volume for items by (1+(1−maximum case fill)) and then dividing by minimum cases. The smallest case that conforms to the above constraints becomes the first selected case to be filled. The selected case is placed as a single "box" on a box list.

Assuming that the box list and item list contain at least one box and item, respectively, the smallest box is then selected from the box list. (If the box list contains no boxes, a new case must be selected; If the item list contains no items, a new order must be received and acted upon.) The longest item on the item list is then selected and placed at position (0, 0, 0) within the box selected from the box list. The item is then evaluated to determine if the item fits into the selected box. The item can be flipped along the z-axis if necessary. Assuming fit, the selected item is then evaluated against case maximum parameters, such as maximum case weight, maximum item count, maximum case fill, and maximum layer count. (If no item from the item list fits into the selected box, then an error has occurred.)

If the selected item fits into the selected box, the selected item is deleted from the loose item pick list and added to a cased item list specific to the selected case. Based on the positioning of the first selected item into the first selected box, three additional "boxes" are next created by extending the x, y, z axes to the sides of the case. One corner of each new box (space) is defined as occupying the position (0, 0, 0). The used space is next deleted from the "Box" List and the three newly created spaces added to the Box List. Boxes on the box list are arranged in ascending order by size. The process then repeats with the selection of the next longest item from the item list, and continues repetitively until all of the box's volume has been filled with items within the established constraints. When no items are left, the order is filled.

Embodiments of the present invention offer a variety of features and advantages. Advantages of embodiments according to the present invention include cost savings. Methods and systems according to the present invention allow for the use of less, or smaller, boxes in optimally packing such boxes. Thus, embodiments reduce waste in reducing the use of larger or more boxes than necessary. Moreover, cost savings may be found in the reduction of shipping cost by using smaller and less boxes. Further, labor cost may be saved in that direction is provided to pickers as to sequence and configuration of packing, which results in less time spent by the picker in making such determinations. Other advantages include the consideration of constraints, such as weight constraints, layer constraints, and similar constraints, in determining the configuration for packing.

Embodiments of the present invention recognizes that absolute optimal utilization of "the bounded region" does not per se present an optimization of costs. Unlike other industries, the PPS industry contains a number of "soft constraints," the cost of which are desirably minimized. Accordingly, the present invention recognizes that an optimal utilization of the bounded region is limited by the costs associated with executing the optimized configuration, i.e., filling the bounded region ("packing"); that optimized utilization of the bounded region requires optimization of fill ("packing") costs; and that optimized utilization of the bounded region is affected by both per-region costs, and region size and weight associated costs. In the PPS, industry costs associated with the bounded region (e.g., cartons, crates, wraps, and filling materials) can be significantly lower than other associated costs, including the cost of filing of the bounded region (i.e., picking and packing). The cost of packing (whether automated or human) frequently exceeds the costs associated with the bounded region, and embodiments of the present invention recognizes and takes advantage of such a situation.

Embodiments of the present invention also recognize that an optimal utilization of the bounded region is limited by the costs associated with executing the optimized configuration, i.e., filling the bounded region ("packing"). Generally, an optimized three-dimensional packing configuration will not be executable by a warehouse laborer in a reasonable period of time in the absence of specific instructions, if at all. A human packer typically acts on intuitive placement strategies when placing parts in a bounded region. These biases, along with computational difficulties, prevent most packers from being able to pack specified items in a specified bounded region despite fit having been predetermined.

The present invention recognizes that optimized utilization of the bounded region requires optimization of fill ("packing") costs. In practicable application, optimized packing of items for shipment requires a packing configuration which optimizes the speed and efficiency of the human packer. Packing speed and efficiency correlate with the skill level and intuitive biases of the packer and with the location within the warehouse of the items to be packed.

Embodiments of the present invention further recognize that optimized utilization of the bounded region is affected by both per-region costs, and region size and weight associated costs. Shipping costs and insurance are two examples. Shipping costs, for instance, can include a minimum cost per box; thus shipment of 100 pounds of goods in three cartons would cost more than shipment of the same goods in two cartons. Similarly, insurance costs can be driven by the number of cartons. The existence of insurance maximums, for instance, and/or the desire to reduce liability exposure can increase the costs associated with use of a single carton over multiple cartons for a given quantity of goods.

Various other features and advantages will be apparent from the detailed description that follows.

BRIEF DESCRIPTION OF THE DRAWINGS

Embodiments and features the invention may be more filly understood from the following drawings, in which.

DETAILED DESCRIPTION

Embodiments of the present invention include methods and systems of optimized sequencing and configuring of items to be packed in a bounded region. For example, the present invention provide methods and systems for optimization of the costs associated with order fulfillment in the PPS (pick, pack, and ship) industry. Embodiments include methods and systems that incorporate the three-dimensional pattern nesting algorithms to sequence and configure items to be picked, packed and shipped. In part, the present invention provides a method suited to the PPS industry for optimized sequencing and configuring of items to be picked, packed and shipped (referred to as a "cartonization routine").

Figure 1:
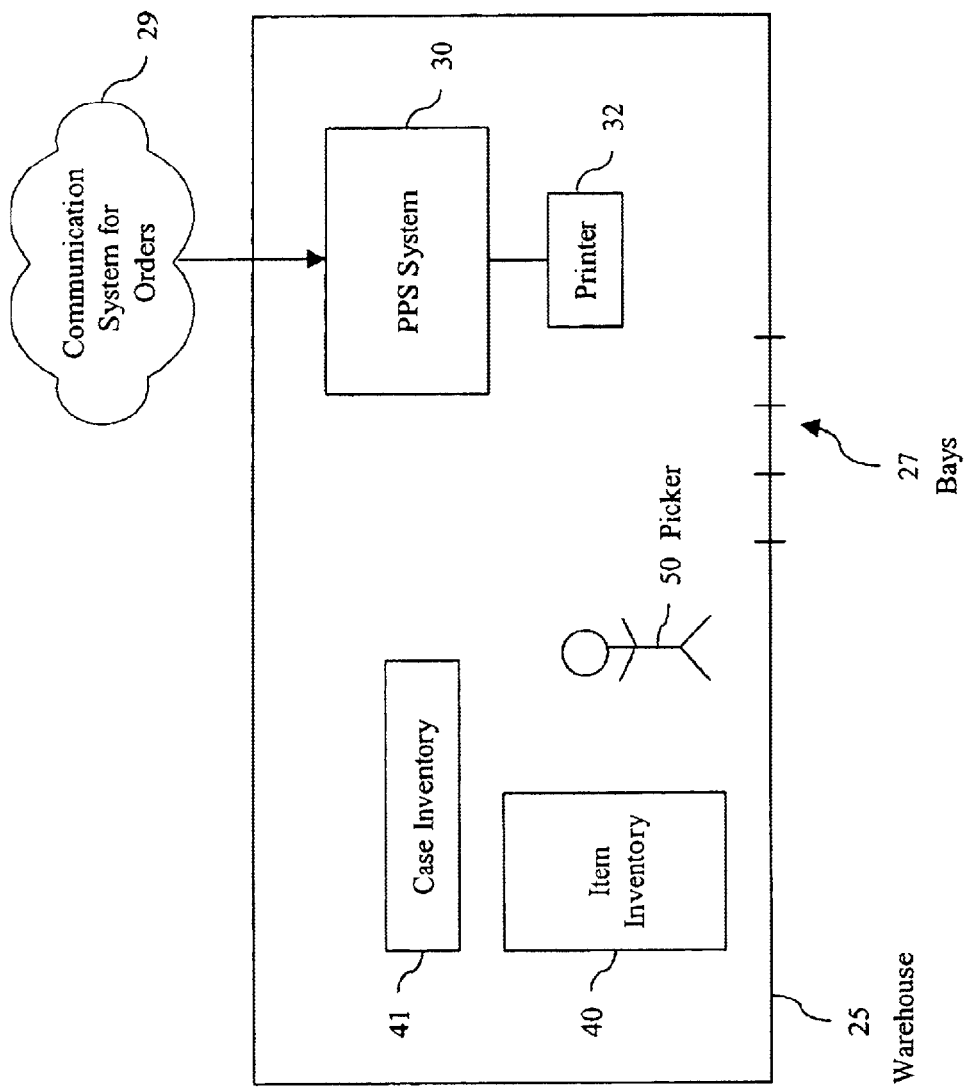
FIG. 1 presents an overview of a system according to the present invention.

Referring to FIG. 1, a system embodying the present invention is shown. A warehouse 25 in which a PPS computer system 30 is housed is shown. The PPS system 30 is in communication with a communication system for orders 29, and receives orders and other communication from such system 29. The PPS computer system 30 is also in communication with a printer 32. The warehouse also houses a physical inventory of items to be picked, packed, and shipped 40, as well as a physical inventory of cases (e.g., shipping boxes) in which such items are to be packed and shipped 41. A human picker 50 is also shown in the warehouse 25. The warehouse 25 also includes docking and shipping bays 27. Any one of a wide variety of computer systems may be used for the system 30. One system that may be used is a Microsoft NT server system. For example, the system 30 may be installed on a Hewlett Packard LC2 model server with Dual Pentium II 266 Mhz CPUs, 512 MB RAM, and 8.0 GB of disk space, and may utilize the NT operating system and an SQL-Server database.

By way of introduction, in an embodiment, the PPS system 30 receives one or more orders, each containing one or more items. In the embodiment shown, the system 30 receives these orders from a communication system for orders 29. The orders comprise digital data (e.g., data files) describing the orders. Orders may include a list of products ordered (items to be packed), their product identification number, quantity, shipping address, description of the product, and related information. The system 30 examines the order and constructs an item list by extracting individual items from the orders. The item list, too, comprises digital data. Item (or order) identifiers (e.g., order identification numbers) are used to connote items in conjunction with data tables having such identifiers associated with items.

The system 30 then determines the cases available for packing, and selects the cases for packing. The system 30 calculates an optimum sequence and configuration of the items on the item list for picking, packing, and shipping in selected cases (e.g., shipping boxes). The system 30 provides this information to human operators by printing picking, packing, and shipping documents indicating the sequence and configuration for picking, packing, and shipping the items on the item list. In an embodiment, this calculation and indication of a sequence and configuration includes designating the type (e.g., the size) of box in which to pack items and the selection of items from an inventory to be placed in the box. In an embodiment, the calculation of sequencing and configuring of the items occurs pursuant to cartonization constraints and a cartonization algorithm.

An embodiment of cartonization constraints and a cartonization algorithm is discussed below. In the embodiment discussed, the sequencing and configuring in accordance with the cartonization constraints and the cartonization algorithm is carried out by the computer system 30 using software coded to carry out such functions. Such software may be programmed in any of a variety of conventional languages, including C++ and Basic, and those of ordinary skill in the art would know how to make and use such software using a programming language from the description of the processes herein.

Cartonization Constraints

In an embodiment of the present invention, the cartonization process incorporates pre-established constraints. These pre-established constraints are stored and retrieved from a constraints table (e.g., a database comprising predetermined constraints and corresponding values) in the PPS system 30. In addition to the constraints discussed below, the constraints table can incorporate packaging requirements based on SKU dimensions and quantities, carton dimensions, and packaging constraints defined by the client.

In an embodiment, the constraints table includes the following pre-defined parameters: (1) maximum case weight; (2) maximum item counts; (3) maximum case fill; (4) maximum layers; (5) item specific values; and (6) cartons specific values. The value of each of these parameters depends on the application in which the embodiment of the present invention is employed, as well as, in some instances, the value of the other constraints. Selection of constraint value is made by one of ordinary skill in the art with reference to the particular application. These pre-defined parameters are discussed further below. In other embodiments, other pre-defined parameters are included in the constraints table. Information included in the constraints table may be included in other tables as well. For example, information about item types may be contained in item-related tables as well.

Maximum Case Weight

"Maximum case weight" is a pre-determined weight that a case (e.g., a bounded region, such as a carton or box, in which items are to be packed), when packed, cannot exceed. Factors that can influence the determination of the maximum case weight value include: the strength limitations of a case; strength limitations associated with human lifting capacity, if applicable; and per case weight limitations imposed by shipper(s). The maximum case weight value can be a single value associated with all case types, or an individual value associated with each case type, similar and/or distinct from the values associated with other case types.

Maximum Item Counts

"Maximum item counts" is a pre-determined item count which a case cannot exceed. The maximum item counts constraint can be both a case-associated value and an item-specific value. For example, in an embodiment, each item type has a maximum item count value associated therewith (e.g., one), meaning the maximum number of that type of item that may be packed in a case. In the embodiment described, each type of case has a maximum item count value associated therewith. For example, if an embodiment employs three sizes of cases, each case will have its own maximum item count, i.e., the maximum number of items that should be placed in the case.

The maximum item counts constraint can act as a means for individually packing specified (for example, fragile) items, said items having an associated maximum item count value equal to the case associated maximum item count value. The maximum item counts constraint also can be used as a means for controlling liability exposure per case. For instance, if a maximum case liability value (e.g., no more than $200 of goods per case) is desired and/or imposed, high value item types can be associated with a lower maximum item count value.

The maximum item counts constraint also provides a means for maximizing or minimizing the number of cases shipped per order. (The significance of maximizing or minimizing the number of cases shipped per order is discussed further in the context of the maximum case fill constraint.) For example, if it is desirable to minimize the number of cases shipped per order, the maximum item count value may be set at a relatively high number.

Maximum Case Fill

"Maximum case fill" is a pre-determined maximum percentage utilization of the space within the bounded region or case (i.e., the carton or box). The maximum case fill constraint is critical to optimization, but often highly difficult to determine. In a purely theoretical model of the cartonization routine of the present invention, a maximum case fill value of one hundred percent (100%) would be optimal. In practical application of the cartonization routine to the PPS, or other industry, a 100% maximum case fill value is not only less than optimal, but also impracticable. For example, in a system according to the present invention used to pick, pack, and ship make-up and beauty related products, a preferred maximum case fill value is 65%.

Determining a maximum case fill value requires consideration of the degree of homology of the items, the relative skill level of those executing the actual fill, and the cost of the time of execution. Depending on the degree of homology of the items assigned to a bounded region of a given size, execution of the optimized packing list can in fact be quite difficult (a rubric's puzzle of sorts). Where the items are nearly 100% homologous, however, the actual packing is quite easy. (Where homology equals 100%, no packing is required; rather a prepackaged case is picked and shipped as is.) Assuming a moderate-degree of homology, a high maximum case fill value (i.e. a "tight" fit) generally presents a difficult and time consuming the packing job.

Another factor considered in the determination of maximum case fill is human packing biases and instructions provided. For instance, packers typically place like items next to each other; additionally, packers typically select items based on proximity and place items into the carton as selected. Instructions can be provided to confirm or reverse these biases. If packers are instructed to pick items in the order listed on the pick label, the pick order can be optimized based on location of items in the warehouse so as to minimize the total distance traveled in the pick, pack process. Packers can also be instructed to place items into the box as picked in a contiguous manner, starting always from a pre-determined corner of the box; in this fashion, packers can be "assisted" in packing the carton.

Another consideration relates to the calculation of payment for the pick, pack and ship service. Somewhat common in the industry is payment predicated on the number of cartons shipped (as opposed to on the number of items ordered, or orders processed). Where payment is predicated on the number of cartons shipped, maximizing case fill benefits the client whereas a lower case fill value favors the pick, pack and ship service provider. In this circumstance, clients may wish to impose a "minimum" maximum case fill value; however, such a value must take into account the same considerations.

Maximum case fill is best determined empirically by the pick, pack and ship service provider, and can be increased or decreased as various factors fluctuate (for instance, a rise in worker skills). Additionally, maximum case fill can vary automatically depending on the homology of the items of a given order.

Maximum Layers

"Maximum Layers" is a pre-determined number of layers of items in a case that cannot be exceeded. The maximum layers value is an item specific value, which can be used to reflect client and customer preferences. A layer limitation is particularly useful as a means to avoid item damage. For example, a client may prefer that perfumes not be packed in multiple layers; thus perfumes may be assigned a maximum layers value of 1 and thus are packed either as part of a single layer, or as the top layer. Fewer layers are preferred for fragile items.

In embodiments, a "first layer"/"no layer restriction" may be used. For example, in an embodiment, items may be assigned a maximum layer value of "1" to reflect that the item must be packed on the first layer of a case or a maximum lawyer value of "0" to reflect that the item may be packed on any layer in the case. In other embodiments, items may be assigned a particular value to reflect the highest layer in which the item may be packed.

Item Specific Values

"Item specific values," such as length, width, height, weight, and pre-pack and carrier quantity, must be determined for each item that may be picked and packed, and is provided in the constraints table. A "carrier" comprises a multiple items package containing two or more items, for example, a three lip-stick pack. A "pre-pack case" may be composed of a pre-determined number of carriers, or a pre-determined number of individual items, and those carriers and/or items are pre-packaged together.

Cartons Specific Values

"Cartons specific values," such as length, width, height, and availability, are also preferably provided in the constraints table. There may be industry circumstances, however, in which it is preferable for the bounded region to be produced as needed (e.g., custom-made crates). Customization of the bounded region is also within the method of the present invention; custom crate dimensions would be added to the master data tables.

Cartonization Algorithm

As mentioned above, once the one or more orders are received, the system 30 carries out a cartonization process. FIGS. 2–7 illustrate an embodiment of a cartonization process according to the present invention. The cartonization process begins with an order that includes various items and with a defined, limited number of types of cases (e.g., boxes) in which to pack the items in the order. The process optimally determines the types of cases to use for the order and the items from the order to pack in each case. The process is carried out in accordance with the cartonization constraints provided in the constraints table.

An embodiment of a cartonization process is described below with reference to FIGS. 2–7. The embodiment described comprises several steps. Each of these steps, and the steps (or sub-steps) associated therewith, are described below.

Figure 2:
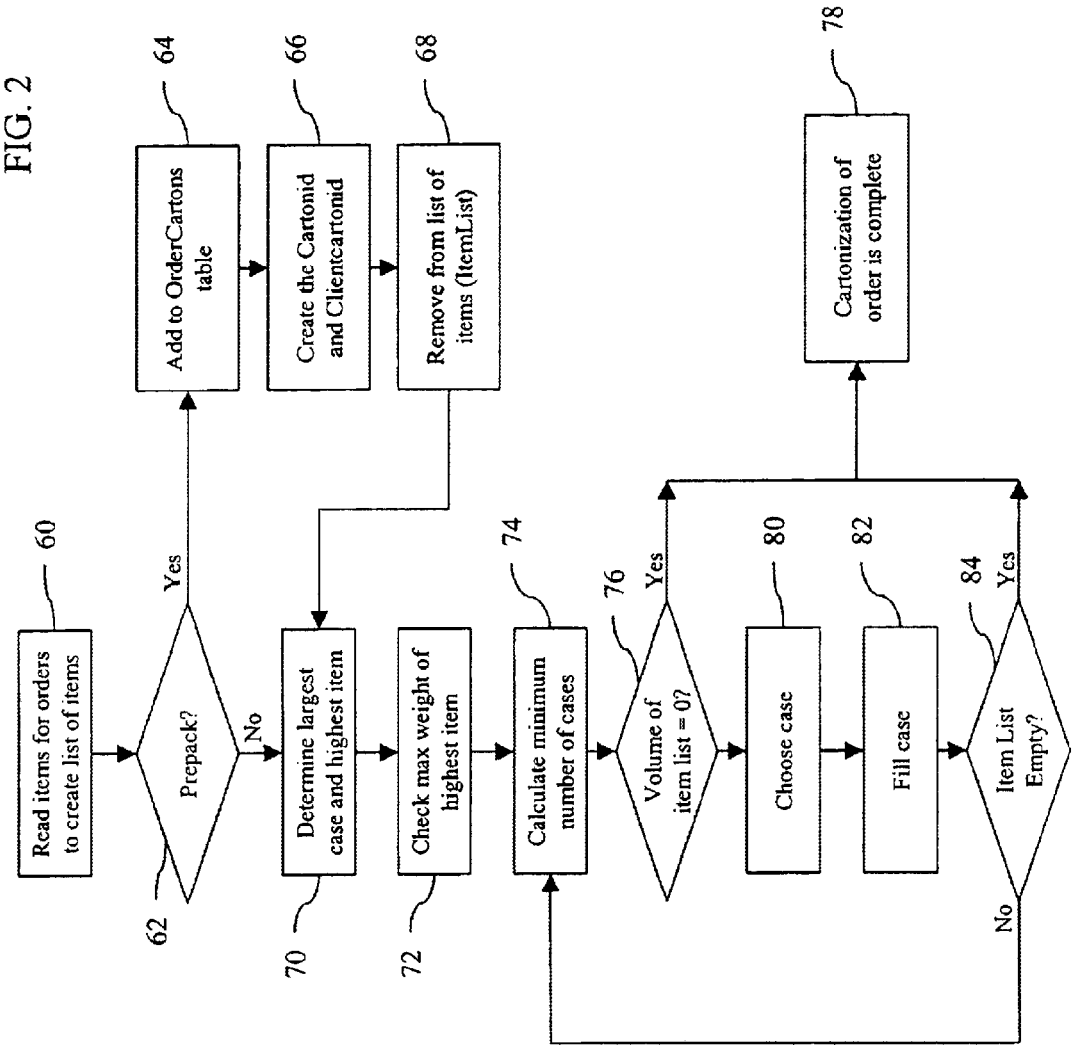
FIG. 2 shows an embodiment of steps carried out in a cartonization process according to the present invention.

Referring to FIG. 2, the system 30 receives one or more orders to be fulfilled (i.e., picked, packed, and shipped). The orders include data typically related to orders, including item identifiers, quantity, shipping address, and similar information. The system 30 examines the item orders and creates an item list comprising a list of items from the item orders received 60. The item list is built by extracting individual items from the orders to be fulfilled. In the embodiment shown, information about each item type is contained in a data table (called an Orderline table) in the system 30. These data tables comprise predefined data tables comprising pre-established information specific to each item. Examples of such pre-established information include size, weight, and related information. Such information may also be found in the constraints table. In embodiments, such information for an item is found in only one table, and other tables include pointers to the information in the one table. The pre-established information correlated in the table by item identifier (e.g., an item number, or an "order identification (OrderID)"). Preferably, the system limits the item list constructed to items ordered for shipment to a single location (e.g., a single shipping address).

Items on the item list are then evaluated to determine if one or more pre-pack cases are being ordered 62. In an embodiment, such evaluation includes determining if a sufficient number of items have been ordered (i.e., are present in the item list) that will make up a pre-pack case. A pre-pack case comprises a pre-defined case of items. The number of pre-pack cases on the item list is calculated by dividing the number of like items by the pre-pack case quantity (the number of items per pre-pack). The integer number below the result (if one or greater) is the number of pre-pack cases that may be formed by the items. For example, if a pre-pack case of lipstick comprises eight tubes of lipstick, the number of like lipstick items (e.g., same product, including color) in the item list is determined and divided by eight. If there are twenty (20) like lipstick items in the list, the number of pre-pack cases that may be formed from the like items is two (twenty (20) divided by eight (8) is two and one half (2.5), and the integer number below two-and-one-half (2.5) is two (2).

If it is determined that one or more pre-pack cases are in the order 62, then the existence and information data for the formed pre-pack cases (including their items) are added to a data table 64 for tracking. The system 30 then selects the case type associated with the pre-pack case and records data—"CartonID" and "ClientCartonID"—to reflect the selection and the order of packing of the pre-pack cases.

A "CartonID" variable reflects a particular case type. For example, if the user of an embodiment of a process according to the present invention has three (3) different case types (e.g., shipping boxes of different sizes) in inventory for use in packing the items in the order, those cases may be assigned CartonID numbers of A1, A2, and A3. The "ClientCartonID" variable reflects a sequential number within the order for each case. For example, the first case selected for packing is assigned a ClinetCartonID variable of 00001, the second case selected is assigned a ClientCartonID variable of 00002, and so on. In the embodiment shown, data reflecting these variables, as selected and assigned by the process, is stored in the "OrderCartons" table in the system 30.

A pre-pack case comprises one of the available case types, and the appropriate case type for each pre-pack case in the item list is selected and recorded in the OrderCartons table 66. For example, if there are four pre-pack cases in the order, the system 30 may determine that the first pre-pack case requires case type A1, the second requires case type A3, the third requires case type A2, and the fourth requires case type A1. The system 30 then records in the OrderCartons table, in association with the four recordations of pre-pack item types recorded in step 64, a case type and sequential number (e.g., 00001, 00002, 00003, and 00004) for each of the four cases selected. The data is used to provide information to the pickers to pick and pack the pre-pack cases.

Items that are determined to be packable in a pre-pack case as above are subtracted from the items list 68. The identification of a pre-pack case allows the human or other pickers to pick a pre-packaged case of the item, rather than picking the number of individual items that make up a case. Pre-pack cases are present in inventory and are sent as already packed. For example, a pre-packaged case of eight (8) like lipstick items will be available in Inventory and available for picking, packing, and shipping in the pre-packaged case.

In an embodiment, loose pick quantities are next converted to carriers, if applicable (not shown). Carriers are multiple item packages (e.g., a package of various types of make-up items). The system 30 determines if items on the item list make up a carrier. If so, the carriers may be added to the item list, including an indication of the items from the item list that comprise the carrier. In an embodiment, pre-pack cases are composed of one or more carriers. For example, if the system determines that items comprising two carriers are present, and that two such carriers comprise a pre-packaged case, the system may add the two carriers to the pre-packaged case list, and remove those items from the item list.

Once the items that make up pre-pack cases are removed from the item list 68, the item list comprises a list of items that are individually picked from an inventory, packaged alone or with other items (generally with other items), and shipped to the recipient address associated with the item. The item list is sometimes referred to as comprising "loose pick items" at this point (after pre-pack case items are removed from the list) to distinguish the items from items in a pre-pack case, and the item list is sometimes referred to as the loose pick item list at this point as well.

Note that in another embodiment, a process according to the present invention comprises reading the item list, detecting the presence of a pre-pack case (as discussed above) and selecting the items associated with the pre-pack case, adding the pre-pack case to the OrderCartons table, creating the CartonID and ClientCartonID (i.e., selecting the appropriate case type for the selected pre-pack case and assigning a sequential case number), removing the items in the pre-pack case from the item list, and then repeating this process until no more pre-pack cases are detected in the item list. Essentially, in such an embodiment, the pre-pack cases are selected and processed one at a time, rather than selected all at once as described in the embodiment of FIG. 2.

Once the step of removing the items in the pre-pack cases are removed from the item list 68, the system 30 continues the process shown in FIG. 2 with step 70. Moreover, if no pre-pack cases were detected in the item list 62, the system 30 would continue from step 62 to step 70.

The minimum number of cases required to hold the items on the loose pick items list is then determined by the system 74. In preparation, the system 30 determines the cases available for packing by examining an inventory list of available cases. This case inventory list is digital data stored on the system 30 and is preferably updated frequently. The case inventory list indicates the type of cases available for packing and the quantity available for each case type. Moreover, each case type is associated in the file with case-related cartonization constraints described above. Further, in preparation, in the embodiment shown, the system 30 determines the largest carton available (e.g., the largest packing box available) and the heaviest (or highest) item present on the loose pick item list 70. In addition, the system 30 determines the maximum weight of the heaviest item on the list 72.

In the embodiment shown, data regarding cases that are available for packing with the items on the item list is stored in the constraints table by the system. Any number of different types of cases may be available, and the data for each type of case available is stored. For example, in the embodiment shown, data regarding available cases includes whether each case type is available, the number of such cases available, the maximum volume that may be held by each of the case types, the maximum items that may be placed in each case, the maximum weight that may be placed in each case, and other information.

The step of determining the minimum number of cases required to hold the items on the loose pick items list comprises several steps (or sub-steps). An embodiment of these steps are shown in FIG. 3.

Figure 3:
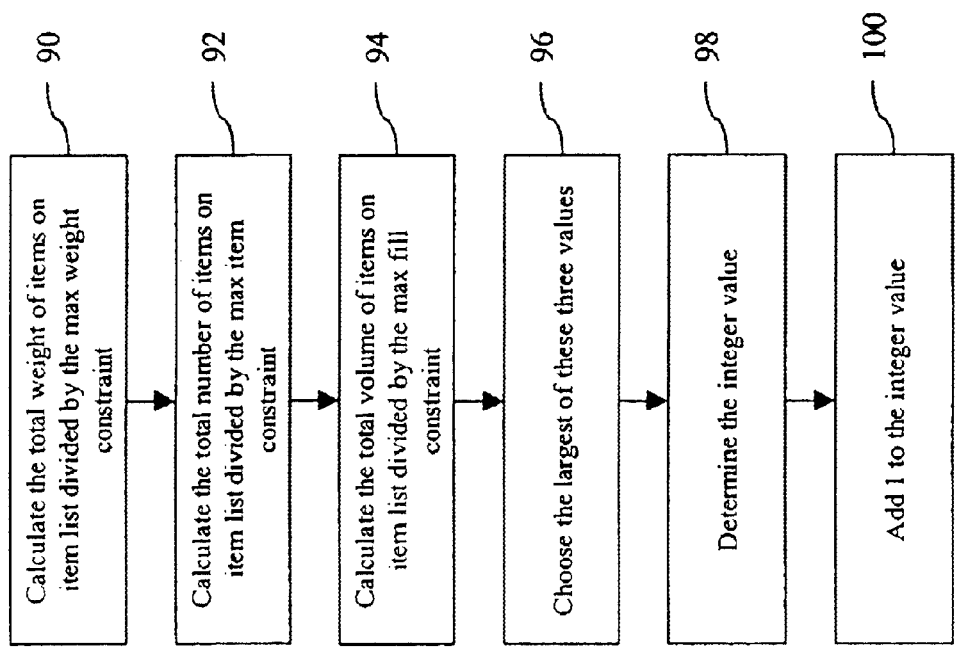
FIG. 3 shows an embodiment of steps carried out in a cartonization process according to the present invention, specifically steps carried out in the calculation of a minimum number of cases for use in an embodiment according to the present invention.

Referring to FIG. 3, in the embodiment, three separate calculations are made. First, the system calculates the minimum number of cases that may be used to pack the items on the item list based on the weight of the items on the item list 90. In the embodiment shown, this calculation 90 comprises dividing the total weight of the items on the item list based on a weight-based minimum case variable 90. In the embodiment shown, the weight-based minimum case variable comprises the total weight of the items in the list of items to be packed divided by a weight constraint value. The weight constraint value comprises the maximum weight constraint of the available cases (i.e., the maximum weight of items that may be placed in the available case that may hold the most weight). The maximum weight constraint is obtained by accessing the maximum weight constraint data discussed above in the cartonization constraints table. As discussed above, this maximum weight constraint may be determined by various factors, including strength and rating of the case and maximum shipping weight allowed by the delivery service employed to ship the case.

Second, the system 30 calculates the minimum number of cases that may be used to pack the items on the item list based on an item-based minimum case variable including the maximum item constraint 92. In the embodiment shown, this calculation 92 comprises dividing an item-based minimum case variable (comprising, in the embodiment shown, the total number of items in the list of items to be packed) divided by an item constraint value. In the embodiment shown, the item constraint value comprises the maximum item constraint (i.e., the maximum number of items that may be packed in the available case that may hold the largest number of items). The maximum item constraint is obtained by accessing the maximum item constraint data discussed above in the cartonization constraints table. As discussed above, this maximum item constraint may be determined by various factors, including size of available case.

Third, the system 30 calculates the minimum number of cases that may be used to pack the items on the item list based on a fill-based minimum case variable including a maximum fill constraint 94. In the embodiment shown, this calculation 94 comprises calculating the fill-based minimum case variable comprising the total volume of items in the list of items to be packed divided by a fill constraint value. In the embodiment shown, the fill constraint value comprises the maximum fill constraint (i.e., the largest predetermined maximum percentage utilization of the space within an available case of the available case types). In the embodiment shown, such a calculation comprises multiplying the total cubic volume of items by the factor (1+(1−maximum case fill)), and dividing the result by the volume of the largest case available. The maximum fill constraint is obtained by accessing the maximum fill constraint data discussed above in the cartonization constraints table. As discussed above, this maximum fill constraint may be determined by various factors, including degree of homology of the items, the relative skill of those executing the actual fill, and the cost of the time of the execution. Thus, it is normally set by experience and judgment within the actual application of the invention. In an application such as picking, packing, and shipping make-up products, a preferred maximum case fill is sixty-five (65) percent.

The largest of these three calculations of minimum number of cases needed is used to determine the minimum number of cases variable. Referring again to FIG. 3, in the embodiment shown, once the three calculations 90, 92, 94 are complete, the system chooses the largest of the three values 96, determines the integer value of the result 98, and adds one (1) to the integer value of the result 100. The result comprises the calculated minimum number of cases that will be used by the system in packing the items at issue.

Referring again to FIG. 2, the system 30 next determines whether the volume of items on the item list is zero (0) 76 (i.e., all items have been evaluated, sequenced, and configured for picking, and removed from the list). If so, cartonization of the order is complete 78. If not, the system 30 chooses cases for filling 80.

Figure 4:
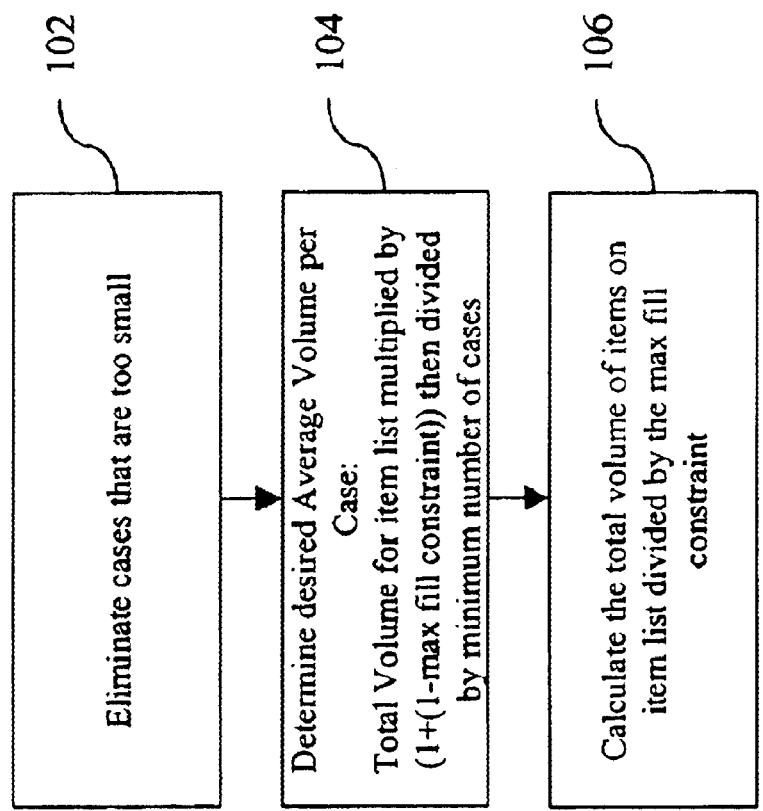
FIG. 4 shows an embodiment of steps carried out in a cartonization process according to the present invention, specifically steps carried out in choosing a case to be filled.

An embodiment of carrying out this step 80 is shown in FIG. 4. This step is called the "choose carton" or "choose case" procedure. Referring to FIG. 4, the system 30 first eliminates available cases that are too small based on the height and length of the individual items on the item list (these being the "loose pick items") 102. For example, the system 30 accesses the constraint table to determine the available case types and their dimensions for packing, and compares those dimensions to the items on the item list for packing. Those case types that have dimensions less than the needed dimensions for the items on the item list are eliminated as possible selections.

From the cases remaining, the smallest case volume which will accommodate average volume per case is determined. In the embodiment shown, the system 30 determines the desired average volume per case to be used for packing 104. The embodiment shown accomplishes this step 104 by calculating the total volume for the items on the item list multiplied by (1+(1−maximum case fill constraint), then dividing the result by the minimum number of cases calculated previously (step enumerated 74) 104. Once the average volume per case is determined, the system 30 determines the smallest of the available case types that can accommodate the calculated average volume per case 106 (e.g., the smallest box in which a volume greater than or equal to the average volume per case is selected). This smallest case that conforms to the above constraints is the chosen case, and the first case chosen becomes the first case selected to be filled.

Figure 5:
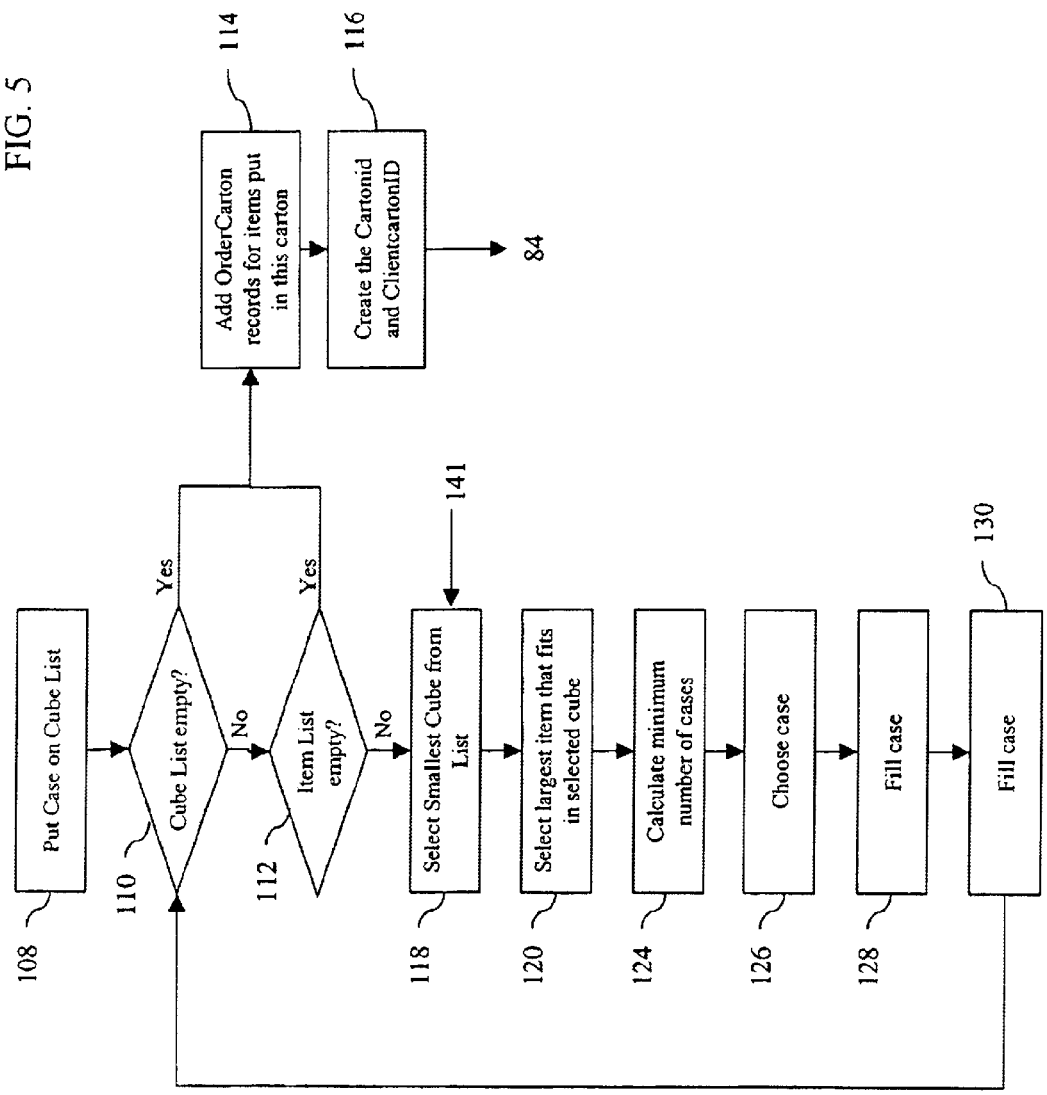
FIG. 5 shows an embodiment of steps carried out in a cartonization process according to the present invention, specifically steps carried out in determining the sequence and configuration of filling cases.
Figure 6:
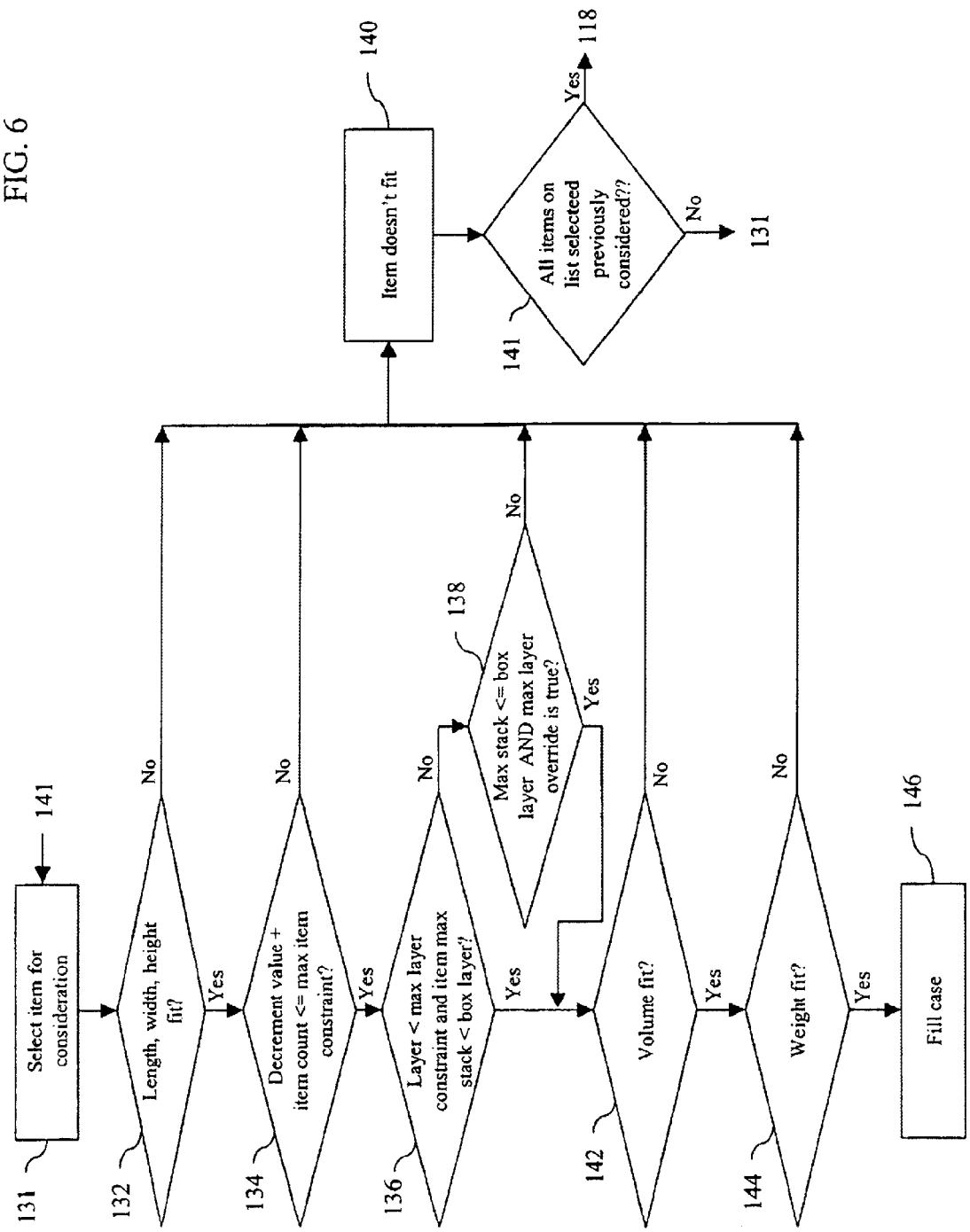
FIG. 6 shows an embodiment of steps carried out in a cartonization process according to the present invention, specifically steps carded out in determining if an ordered item will fit in a selected case.

Next, the selected case is filled 82. In this step 82, the sequence and configuration of packing items in cases is determined. Referring again to FIG. 2, after the case to be filled is chosen 80, the system 30 determines how the case chosen is to be filled 82. An embodiment of steps carrying out this step 82 is shown in FIG. 5 and FIG. 6. Such steps are sometimes called the "Fill Carton" routine or the "Fill Case" routine.

Figure 7:
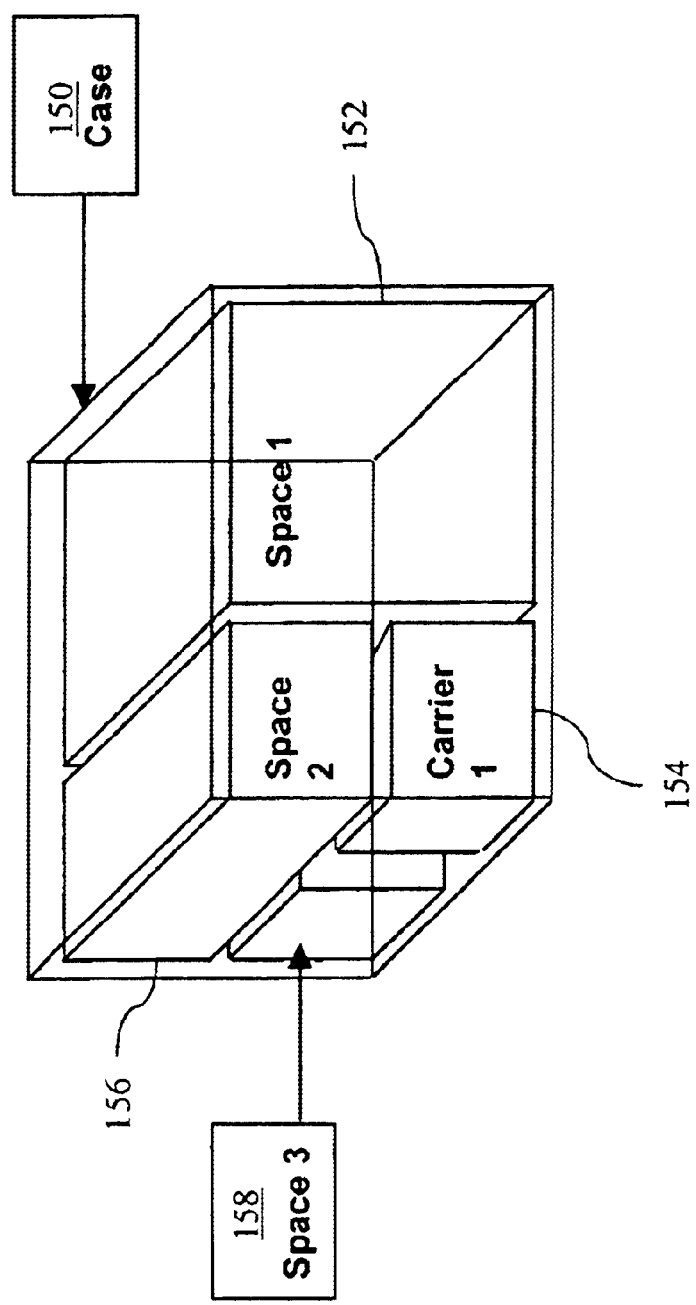
FIG. 7 illustrates the three "box" analogy for the allocation of space in a cartonization process according to the present invention.

An embodiment employs the repeating process of item placement and the division of the remaining space in the case into cubes. In an embodiment, first, the longest and tallest item in the item list is selected for placement in the case, and that item is removed from the item list. Then, the area in the case not taken up by the item is divided into one or more cubes. As an example, FIG. 7 shows a case 150 in which one item (a carrier) 154 has been placed. The area not taken up by the item 154 is divided into three cubes (or spaces) 152, 156, 158. The one or more cubes are placed on a "cube list," and the smallest cube on the cube list is selected for examination first. Then, the system determines whether an item on the item list will fit into one of the cubes on the cube list. If so, the item is placed into the cube in which it will fit. Then, the area in the case not taken up by the items already placed in the case is divided into one or more cubes, and the process repeats itself with fitting items into the remaining cubes and recalculating cubes until no item will fit into a remaining cube.

Those of ordinary skill in the art will recognize that the discussion of placement into the case during the cartonization process is a simulated, or calculated, placement, rather than actual, physical placement of the items. The resulting simulated, or calculated, placement will provide direction for the actual, physical placement.

Referring to FIG. 5, an embodiment of such a process is shown. First, the system places the case selected in step 80 on a cube list 108. A cube may also be called a "box" or a "space" (as a case may also be called a "carton" or "box" in context). The cube list comprises a data file having information (or references to information) about one or more defined volumes (called cubes, boxes, or spaces) that are defined volumes within the case to be filled. When the fill case process starts, and the selected case is placed on the cube list 108, the entire volume of the case is the only cube on the list.

Next, the system 30 examines the cube list (the file) to determine if the cube list is empty 110 (i.e., no cubes are listed in the cube list). If the cube list is empty, the recordation of packing information for the case at issue is finalized by adding the items to be packed to the OrderCarton table in the order selected by the process 114, and by recording an identifier for the case type selected by the process as CartonID 116, and by recording a sequential identifier for the case selected in association with the items selected and recorded 116. After step 116 is complete, the system 30 returns to step 84 shown in FIG. 2.

If the cube list is not empty, the system 30 examines the item list to determine whether the item list is empty (i.e., whether all items have been removed from the item list) 112. If the item list is empty, then the system 30 carries out the steps described above 114, 116, and returns to step 84 in FIG. 2.

Of course, when the process begins, and the case is added to the cube list 108, neither the cube list nor the item list will normally be empty. When the process repeats, however (discussed further below), the cube list may be empty in that all viable cubes may have been selected and evaluated previously, and the item list may be empty in that all items have been designated for packing.

If neither the cube list nor the item list is empty, the system 30 selects the smallest cube (by volume) in the cube list for consideration 118. Note that in other embodiments, depending on the application, the largest cube (by volume) in the cube list may be selected first, and the process may proceed with evaluating smaller and smaller cubes, rather than larger and larger cubes as does the embodiment described in FIG. 5.

In the first instance, the only cube in the cube list is the entire case volume, and so the cube comprising the entire case volume is normally selected in this step 118 upon its first employment. Next, the system 30 selects the largest item on the item list that will fit in the selected cube 120. The largest item may be chosen in a variety of ways. For example, the length and height of items may be weighed equally in selecting items. As another example, the longest item on the item list may be chosen, and if there are two equally tall items, the one item of the two equally tall items that is the longest is selected for consideration.

After selecting the largest item that will fit in the selected cube, the system 30 determines whether an item from the item list will fit in the cube under consideration (in the first instance, the entire case volume). Moreover, in the embodiment shown, the step of determining fit may include evaluation of the longest, tallest item that will fit in the cube volume available against the case maximum parameters, including (1) Maximum case weight; (2) Maximum item count; (3) Maximum case fill; and (4) Maximum layer count.

Presumably, because of the procedures involved in selecting the case in the first instance, an item from the item list will fit in the entire case volume, and thus the procedure for checking cube space for fit is discussed in further detail below after further context to the entire procedure is provided. The checking if the item will fit is the same in the first instance as later instances, however.

If no items will fit into the selected cube, an order validation error is written to an error validation log table and the item is deleted from the box list, and, in an embodiment, the process then returns to the step of selecting a different cube or a different case. (Items placed on the error validation log table will need to be reviewed and acted upon individually at a later time).

Again, it is presumed here for the sake of clarity that an item will fit in the first instance when the full case is considered. A full description of the selection of the largest item that will fit in the selected cube (i.e., the carrying out of step 120) is described below with reference to FIG. 6.

Once the item is selected for placement in the selected cube in step 120, the item is put in the cube by the system 124. In other words, the system 30 designates the selected item as occupying the selected cube, and records this designation in a data file. In an embodiment, the longest, tallest item is placed at position (0, 0, 0) within the case selected from the case list.

Once the longest, tallest item that will fit into the cube under consideration is determined 120 and the designation of the item and its placement in the case is designated and recorded 124, the system 30 removes the item so selected from the item list 126. As mentioned above, in doing so, the system 30 designates the volume associated with the one cube to be packed as occupied by the item selected for packing in the cube, and this designation is recorded in a data file.

Based on the positioning of the first selected item into the first selected box, the area in the case not taken up by placed item(s) is divided into one or more cubes 128. In an embodiment, these additional cubes (or "boxes") are determined (or created) by extending the x, y, z axes to the sides of the case in relation to the area taken up by the placed item(s). After the placement of the first item, in a preferred embodiment three additional cubes (or "boxes") are next determined (or created) by extending the x, y, z axes to the sides of the case in relation to the area taken up by the placed item.

FIG. 7 shows an example of a case divided into cubes. In FIG. 7, the carrier 154 has been selected as the longest, tallest item on the item list that will fit in the case 150 by the process described above 120, 122, 124. Then, the system 30 extends the axes as described above to define three cubes 152, 156, 158 (marked as Space 1, Space 2, and Space 3). These cubes bound the area in the case 150 that is not taken up by the placed item, the carrier 154. One corner of each new cube (i.e., box or space) 152, 156, 158 is defined as occupying the position (0, 0, 0) for its associated cube.

Next, the system adds the cubes 152, 156, 158 to the cube list, and deletes the cube just considered (in the first instance, the cube comprising the entire case area) from the cube list. In this way, the used space (e.g., the space taken up by the carrier 154 in FIG. 7) is deleted from the cube list. Cubes in the cube list are arranged in ascending order by size. Thus, in the example of FIG. 7, when the system 30 adds cubes to the cube list 130, the first cube placed on the list is the Space 3 cube 158, followed by the Space 2 cube 156 and the Space 1 cube 152.

Afterwards, the process repeats itself until all of the case's volume has been filled with items within the established constraints. Thus, after cubes are added to the cube list 130, the system 30 returns to step 110, and examines the cube list to determine whether the cube list is empty 110, and examines the item list to determine whether it is empty 112, as discussed above.

If neither the item list nor the cube list is empty, the system 30 selects the smallest cube from the cube list 118. In the example of FIG. 7, the Space 3 cube 158 is chosen as the cube under consideration because it is the smallest of the cubes now on the cube list.

Next, the system 30 determines the largest item that will fit in the selected cube 120. FIG. 6 shows an embodiment of such a determination. As is shown in FIG. 6, the item under consideration for placement in the cube is evaluated against the case maximum parameters presented in the constraints table, including maximum case weight, maximum item count, maximum case fill, and maximum layer count.

Referring to FIG. 6, the system 30 first selects the longest, tallest item on the item list for consideration 131. Then the system 30 compares the length, width, and height of the item selected for consideration in step 131 with the length, width, and height of the cube under consideration (the cube selected in step 118) 132. If there is a fit (i.e., the dimensions of the item under consideration does not exceed that of the cube under consideration), then the item under consideration is evaluated against the maximum item count constraint 134. In the embodiment shown, the system 30 determines whether the current item count (i.e., the number of items already selected for placement in the case) plus a decrement value is less than or equal to the maximum item constraint value. For example, if four (4) items have been placed in the case, and the decrement value of the item at issue is one (1) (a normal value), and the maximum item constraint value is six (6) (which represents a maximum number of items for the case of five (5)), then the item count has not been exceeded with the addition of the item under consideration.

If the maximum item count for the case under consideration has not been exceeded, then the item under consideration is evaluated against the maximum layer count constraint 136. In the embodiment shown, the system 30 determines if the layer into which the item under consideration would be placed is less than the maximum layer constraint value, and if the maximum stack constraint value for the item under consideration is less than the case layer into which the item would be placed 136. If either of these determinations 136 are made in the negative, then the system 30 determines whether the maximum stack constraint value is less than or equal to the case layer into which the item would go, and whether a user of the system 30 has adjusted the a maximum layer override variable to "True" 138. When the maximum layer override is set to true, the system 30 ignores situations in which the item at issue will be placed in a layer above the highest layer at which its maximum layer constraint will allow the item to be placed.

If both of these determinations 138 are in the affirmative, or if the determination of step 136 is in the affirmative, the system then determines whether the item under consideration is less than the volume of the cube under consideration 142. If so, the system 30 next compares the weight of the item under consideration (and the items already placed in the case under consideration) with the maximum weight that the case may hold to determine whether adding the item under consideration will not cause the maximum case weight to be exceeded 144. If so, the system 30 concludes that the item under consideration will fit in the cube under consideration 146, and the item under consideration becomes the item selected for packing resulting from step 120.

Note that if the results of the steps shown as items 132, 134, 138, 142, or 144 is a negative determination, the system 30 concludes that the item under consideration will not fit in the cube under consideration 140. If such a determination is made, the system 30 determines whether all of the items on the item list have been selected for consideration for placement in the cube under consideration 141. If not all items have already been examined in the process for placement in the cube under consideration, the process returns to step 131. Then, the system 30 selects the longest, tallest item not yet considered for placement in the cube under consideration 131, and begins the process again at step 132 again, this time examining the newly-selected item (i.e., the item smaller than the item just considered, but larger than the other items on the list) in the same steps 132, 134, 136, 138, 142, 144 as described.

If the system 30 determines that the item under consideration is the last item on the list that has not been previously considered for the cube under consideration 141, there are no further items to be considered for the cube, and the process concludes that no item in the item list will fit in the cube under consideration, and will return to step 118 to select for consideration the next cube on the cube list.

If such occurs, referring again to FIG. 5, the system 30 selects the smallest cube on the cube list not previously selected for consideration 118 (i.e., the system selects a cube that is larger than the cube just considered, but smaller than the other cubes on the list). The next cube on the cube list is the next largest cube on the list. The process then continues with step 120 as described, with the next largest cube on the cube list as the cube under consideration. If the system 30 determines that all cubes have been examined when selecting the next cube 118, the system 30 will return the process to step 80 to select a different case 80.

Returning to a discussion of an item selected that will fit at step 146, once the system 30 determines that the item under consideration will fit in the cube under consideration 146, the system 30 returns to step 124 in FIG. 5. Next, the system 30 puts the item selected in step 120 for placement into the cube under consideration (and thus into the case under consideration) as described above. The item selected is then removed from the item list 126, and the system evaluates the unused area in the case to construct new cubes 128, as described above. If there is insufficient space remaining in the case, then no new cubes are created. For example, if the maximum fill percentage for the case has been reached, or will be reached with the selection of new cubes, no new cubes are created. These new cubes are then added to the cube list 130, and the previous cubes are deleted, and the system 30 returns to step 110, and repeats the procedure described until the cube list or the item list is empty.

Thus, in this manner, the items on the item list are placed into cases according to the algorithm shown. After the system 30 determines that the cube list or item list is empty 110, 112, and the process of steps 114 and 116 are carried out, the system 30 goes to the next step shown in FIG. 2, step 84. Referring to FIG. 2, the system 30 examines the item list 84, and if it is empty, the system 30 considers the cartonization of the order(s) complete 78. If the item list is not empty at this point, the system 30 determines that it must select a new case for consideration, begin anew in calculating the minimum number of cases and otherwise carrying out the cartonization process, and returns to step 74 to do so. Note that in another embodiment, once the system 30 determines that the item list is empty in step 84, the system 30 proceeds to step 80 and chooses another case for evaluation.

When no viable boxes are left on the box list, the case is filled. Moreover, when no items are left in the order file, the order is filled. If another order is available for processing, in an embodiment, the system 30 repeats the process described above until all available orders are processed.

Cartonization Deliverables

The system 30 records the information related to cartonization determined in the process described above, such as case types selected for packing items in an order and the items in the order selected for packing in each selected case. As described, this information is recorded in the OrderTable file. For each order, the cartonization process provides information (called "deliverables") which is recorded by the system 30 in a deliverables data file (i.e., the OrderTable file). The deliverables information includes:

(1) A list of loose pack cases for use in packing loose pick items in the order, including case type, (2) For each case in the list of loose pack cases for use in packing loose pick items, a list of the loose pick items to be packed in the loose pack case, including (a) item number and number of each item to be picked and packed in the loose pack case; (b) carrier number and number of each carrier to be picked and packed in the loose pack case; and (c) sequence and configuration for picking and packing the loose pick items (both loose items and carriers);

(3) A list of pre-pack cases in the order, including case type; and (4) For each pre-pack case in the list of pre-pack cases, an indication of the pre-pack case number or other identifier for picking the pre-pack case.

In the embodiment shown, for each order, the system 30 prints this information on a "pick label." The pick label includes an indication of a type of box that the picker should use and an indication of the items that the picker should pack into the box. The pick label indicates the type of box that should be selected for the indicated items. The items are listed in the order selected by the process described above, which reflects the order in which a picker is to pack the items. The picker is instructed to select the indicated box, select (i.e., pick) the items indicated on the list from inventory in the order indicated, and to pack the indicated box with the items indicated in the order indicated. Once the picker packs the box in the manner indicated on the pick label, the box is ready for shipping or for further processing, as desired.

The configuration information provided for each item on the pick label includes information indicating placement in the case for the item. For example, the pick label may include coordinates for placement of the item in the case (e.g., 0, 0, 0), an indication of relative placement (e.g., front, right hand side, second layer), or any other such indication.

Referring again to FIG. 2, the PPS system 30 causes the pick label to print on the printer 32 attached to the system 30. The picker 50 receives the pick label and follows the directions thereon to select appropriate cases from the case inventory 41, and to select items from the item inventory 40 to place in the cases. The picker 50 is directed to pick the items in the order shown on the pick label, which corresponds to the order items were selected for placement in a case during the process described above (i.e., first item selected in the process described is the first item that the picker is directed to pick and pack in the box, the second item selected in the process is the second item that the picker is directed to pick and pack, and so on). Once items are picked and packed as directed on the pick label, the picker 50 places the items in a staging area (not shown) for further processing (e.g., sealing) and eventual shipment on trucks or other vehicles that receive the cases in the bays 27.

Other embodiments may be constructed in accordance with the present invention. For example, the picker is described herein as a human being. However, embodiments may include mechanical and computerized pickers that receives the deliverable information from the cartonization process in the form of a data file, and then uses mechanical or robotic machinery to pick items from an inventory and to place the items in the indicated box.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

That which is claimed:

1. A computerized method of optimized placement of items in a bounded region, comprising:
   (a) examining an order comprising a list of items to be packed;
   (b) determining the cases available for packing;
   (c) determining the minimum number of cases required for packing the items in the list of items to be packed;
   (d) selecting a case to be packed with one or more of the items in the list of items to be packed, wherein the selecting the case comprises determining a desired average volume per case and selecting the smallest of the cases available to be packed that comprises a volume in excess of the desired average volume per case; and
   (e) determining the configuration of placement in the case to be packed of items in the list of items to be packed; and
   (f) if the list of items to be packed is not empty, repeating steps (d)–(e).

2. The method of claim 1 wherein the step of determining the cases available for packing comprises examining a list of available case types.

3. The method of claim 2 wherein the list of available case types comprises an indication of the quantity available for each case type.

4. The method of claim 1 wherein the step of determining the minimum number of cases required for packing the items in the list of items to be packed comprises calculating a weight-based minimum case variable.

5. The method of claim 4 wherein the weight-based minimum case variable comprises the total weight of the items in the list of items to be packed divided by a weight constraint value.

6. The method of claim 5 wherein the weight constraint value comprises the largest maximum weight constraint value of the cases on the list of available case types.

7. The method of claim 6 wherein the step of determining the minimum number of cases required for packing the items in the list of items to be packed further comprises calculating an item-based minimum case variable.

8. The method of claim 7 wherein the item-based minimum case variable comprises the total number of items in the list of items to be packed divided by an item constraint value.

9. The method of claim 8 wherein the item constraint value comprises the largest maximum item constraint value of the cases on the list of available case types.

10. The method of claim 9 wherein the step of determining the minimum number of cases required for packing the items in the list of items to be packed further comprises calculating a fill-based minimum case variable.

11. The method of claim 10 wherein the fill-based minimum case variable comprises the total volume of items in the list of items to be packed divided by a fill constraint value.

12. The method of claim 11 wherein the fill constraint value comprises the largest maximum fill constraint value of the cases on the list of available case types.

13. The method of claim 12 wherein the step of determining the minimum number of cases further comprises adding one to the integer value of the largest of the weight-based minimum case variable, item-based minimum case variable, and fill-based minimum case variable.

14. The method of claim 13 wherein the minimum number of cases comprises one plus the integer value of the largest of the weight-based minimum case variable, item-based minimum case variable, and fill-based minimum case variable.

15. The method of claim 1 further comprising the step of determining whether the list of items comprises one or more items making up a pre-packaged case, and, if so, removing the one or more items making up the pre-packaged case from the list of items.

16. The method of claim 1 wherein the desired average volume per case comprises A*B/C, where;
   A=the total volume of all items on the list of items to be packed,
   B=1+(1−a maximum fill constraint), and
   C=the minimum number of cases required for Racking the items in the list of items to be packed.

17. The method of claim 1 wherein the step of determining the configuration of placement in the case to be packed of items in the list of items to be packed comprises
   (g) dividing unused volume in the case to be packed into one or more cubes;
   (h) selecting a one cube to be packed from the one or more cubes;
   (i) selecting an item for packing from the list of items to be packed that the one cube to be packed can accommodate;
   (j) remove the item for packing from the list of items to be packed;
   (k) designating the volume associated with the one cube to be packed as occupied by the item for packing; and
   (l) if volume within the case that may hold an item from the list of items to be packed has not been designated as occupied, and if the list of items to be packed is not empty, repeating steps (g)–(l).

18. The step of claim 17 wherein, if no items for packing have yet been designated for placement in the case to be packed, the step of dividing unused volume in the case to be packed into one or more cubes comprises designating the entire volume of the case to be packed.

19. The method of claim 18 wherein the step of selecting a one cube to be packed from the one or more cubes comprises selecting the smallest of the one or more cubes.

20. The method of claim 19 wherein the step of selecting an item for packing from the list of items to be packed that the one cube to be packed can accommodate comprises selecting the largest of the items from the list of items to be packed not previously selected in association with the one cube to be packed.

21. The method of claim 20 wherein the step of selecting an item for packing from the list of items to be packed that the one cube to be packed can accommodate further comprises determining whether the volume of the item for packing is less than the volume of the one cube to be packed.

22. The method of claim 21 wherein the step of selecting an item for packing from the list of items to be packed that the one cube to be packed can accommodate further comprises determining whether the dimensions of the item for packing are less then the dimensions of the one cube to be packed.

23. The method of claim 22 wherein the step of selecting an item for packing from the list of items to be packed that the one cube to be packed can accommodate further comprises determining whether addition of the item for packing to the case would result in exceeding the maximum item constraint of the case to be packed.

24. The method of claim 23 wherein the step of selecting an item for packing from the list of items to be packed that the one cube to be packed can accommodate further comprises determining whether it is preferred that the item not be placed in the layer of the one cube to be packed.

25. The method of claim 24 wherein the step of selecting an item for packing from the list of items to be packed that the one cube to be packed can accommodate further comprises determining whether addition of the item for packing to the case to be packed would result in exceeding the maximum weight constraint of the case to be packed.

26. The method of claim 25 wherein the step of designating the volume associated with the one cube to be packed as occupied by the item for packing comprises recording the coordinates of the volume associated with the one cube in association an identifier for the item for packing.

27. The method of claim 17 wherein the step of determining the configuration of placement in the case to be packed of items in the list of items to be packed comprises recording the configuration in a deliverables data file.

28. The method of claim 27 further comprising printing a pick label.

29. The method of claim 28 wherein printing a pick label comprises printing data in deliverables data file.

30. The method of claim 29 wherein the pick label indicates the type of case for packing and a list of items for packing in the type of case.

31. The method of claim 1 wherein the step of determining the configuration of placement in the case to be packed of items in the list of items to be packed comprises recording the configuration in a deliverables data file.

32. The method of claim 31 further comprising printing a pick label.

33. The method of claim 32 wherein printing a pick label comprises printing data in the deliverables data file.

34. The method of claim 33 wherein the pick label indicates the type of case for packing and a list of items for packing in the type of case.

* * * * *

UNITED STATES PATENT AND TRADEMARK OFFICE
CERTIFICATE OF CORRECTION

PATENT NO. : 6,876,958 B1  
DATED : April 5, 2005  
INVENTOR(S) : Ashfaque Chowdhury, Richard F. Lane and Jennifer Janke It is certified that error appears in the above-identified patent and that said Letters Patent is hereby corrected as shown below:

Column 2,  
Line 61, "calculated" should read -- calculate --.

Column 5,  
Line 54, "filly" should read -- fully --.

Column 6,  
Line 7, "carded" should read -- carried --.

Column 18,  
Line 36, "," should be -- ; --.

Signed and Sealed this

Fourth Day of April, 2006

JON W. DUDAS  
*Director of the United States Patent and Trademark Office*